United States Patent
Liao et al.

(10) Patent No.: US 7,983,008 B2
(45) Date of Patent: Jul. 19, 2011

(54) PIEZOELECTRIC ACTUATED SUSPENSION WITH PASSIVE DAMPING IN HARD DISK DRIVES

(75) Inventors: Wei-Hsin Liao, Hong Kong (HK); Kwong-Wah Chan, Hong Kong (HK)

(73) Assignee: The Chinese University of Hong Kong, Hong Kong (CN)

( * ) Notice: Subject to any disclaimer, the term of this patent is extended or adjusted under 35 U.S.C. 154(b) by 1124 days.

(21) Appl. No.: 11/551,734

(22) Filed: Oct. 23, 2006

(65) Prior Publication Data
US 2008/0094758 A1   Apr. 24, 2008

Related U.S. Application Data

(60) Provisional application No. 60/729,243, filed on Oct. 24, 2005.

(51) Int. Cl.
*G11B 5/56*   (2006.01)
(52) U.S. Cl. .................................................. 360/294.4
(58) Field of Classification Search ............... 360/294.1, 360/294.3–294.4
See application file for complete search history.

(56) References Cited

U.S. PATENT DOCUMENTS

| | | | | |
|---|---|---|---|---|
| 5,315,203 A * | 5/1994 | Bicos | ............................ | 310/326 |
| 5,485,053 A * | 1/1996 | Baz | ................................ | 310/326 |
| 5,838,092 A | 11/1998 | Wang et al. | | |
| 6,268,983 B1 * | 7/2001 | Imada et al. | ................ | 360/294.3 |
| 6,297,933 B1 * | 10/2001 | Khan et al. | ................. | 360/244.2 |
| 6,404,600 B1 | 6/2002 | Hawwa et al. | | |
| 6,421,211 B1 * | 7/2002 | Hawwa et al. | ............. | 360/294.4 |
| 6,512,659 B1 * | 1/2003 | Hawwa et al. | ............. | 360/294.6 |
| 6,680,826 B2 | 1/2004 | Shiraishi et al. | | |
| 6,760,194 B2 | 7/2004 | Shiraishi et al. | | |
| 6,807,030 B1 | 10/2004 | Hawwa et al. | | |

OTHER PUBLICATIONS

Liao et al., "Characteristics of Enhanced Active Constrained Layer Damping Treatments With Edge Elements, Part 2: System Analysis", Transactions of the ASME, Oct. 1998, vol. 120, pp. 894-900.*
Liao et al., "A new active constrained layer configuration with enhanced boundary actions", Smart Material Structures, Aug. 19, 1996, vol. 5, pp. 638-648.*
Chan et al., "Active-passive hybrid piezoelectric actuators for high precision hard disk drive servo systems," Proc. of SPIE vol. 6173, pp. 617303-1 thru 617303-10, 2006.

(Continued)

*Primary Examiner* — Craig A. Renner
*Assistant Examiner* — Carlos E Garcia
(74) *Attorney, Agent, or Firm* — Evan Law Group LLC

(57) ABSTRACT

A piezoelectric actuated suspension with passive damping is disclosed for precision positioning of hard disk drive while reducing undesired shock vibrations. Along the longitudinal axis of an etched suspension, two piezoelectric actuators dispose near the base plate to provide a push-pull motion. The actuators have two main portions. The first portion is piezoelectric elements to provide active positioning. The second portion is viscoelastic damping layers underneath the piezoelectric elements for passive damping. The complementary parts such as stiff edge elements and optional soft boundary covers are used to enhance the actuating abilities of the actuators and prevent any contaminants of the viscoelastic layers from going into the clean sealed chamber of the hard disk drive, respectively. The present invention further relates to a dual-stage servo system in a hard disk drive for fine positioning of the read/write head and better shock resistance via the piezoelectric actuated suspension with passive damping.

11 Claims, 5 Drawing Sheets

OTHER PUBLICATIONS

Chan et al., "Precision Positioning of Hard Disk Drives Using Piezoelectric Elements," Proceedings of the 15$^{th}$ International Conference on Adaptive Structures and Technologies, Oct. 25, 2004, 12 pages.

K. W. Chan, W. H. Liao, and I. Y. Shen, "Precision Positioning of Hard Disk Drives Using Piezoelectric Elements," Proceedings of 15th International Conference on Adaptive Structures and Technologies, Oct. 25, 2004.

K. W. Chan and W. H. Liao, "Active-Passive Hybrid Piezoelectric Actuators for High-Precision Hard Disk Drive Servo Systems," Proceedings of SPIE Conference on Smart Structures and Materials, SPIE vol. 6173, pp. 617303.01-617303.10, 2006.

* cited by examiner

PIEZOELECTRIC ACTUATED SUSPENSION WITH PASSIVE DAMPING IN HARD DISK DRIVES

CROSS-REFERENCE TO RELATED APPLICATIONS

This application claims the benefit of U.S. provisional patent application Ser. No. 60/729,243 filed on Oct. 24, 2005 which is explicitly incorporated by reference in its entirely.

FEDERALLY SPONSORED RESEARCH

Not Applicable

SEQUENCE LISTING OR PROGRAM

Not Applicable

BACKGROUND OF THE INVENTION

1. Field of Invention

This invention is related to piezoelectric actuated suspensions with passive damping, specifically to such suspensions are used for positioning precision and shock resistance in dual-stage hard disk servo systems.

2. Prior Art

Positioning precision and shock resistance are crucial to today's increasingly high-speed, high-capacity, high data density, and miniaturized hard disk drives. The main operation of a hard disk drive is to store and retrieve the bit data by positioning a magnetoresistive read/write head at a specific target area over a rotating magnetic data storage platter at high speed. To store the information, the read/write head writes the bit data onto the platter by aligning magnetic poles set in concentric data tracks on the platter. And so as to read the information stored, the head will sense the change of the magnetic flux on the platter. It excites the current in the head coil and the read voltage pulses at the flux transitions are then translated into sequences of data bits. In order to increase the recording density and data storage of disks, the bit length on the track and track width are shrinking further. Besides shrinking the bit length on the track, decreasing in the track width becomes more important to meet the requirement of high capacity and high data density hard disk drives. The higher the track density on a platter, the more data can be stored on a given hard disk drive.

In a typical disk drive, the magnetic heads are supported and held above the disk surfaces by a voice coil motor (VCM) arm. As the VCM moves back and forth, the sliders are positioned over the surfaces of the disk and the read/write heads on the sliders are held at an exact position relative to the surfaces for reading or writing; furthermore, they are able to move from one track to another track to allow access to the entire surfaces of the disk. However, since the operational speed becomes faster and the track width becomes thinner, the conventional single stage VCM is difficult to meet the demands due to its mechanical limitations. The problem of track misregistration due to track runout would lead to a track seeking or following error during read/write operation.

Therefore, the demand for higher bandwidth servo systems that can quickly and precisely position the read/write head on a high track density becomes more pressing. In recent years, the idea of applying dual-stage actuators to track servo systems has been developed to solve the limitations of traditional servo system design such as U.S. Pat. No. 6,760,194 B2 (2004) and U.S. Pat. No. 6,680,826 B2 (2004) to Shiraishi et al., and U.S. Pat. No. 6,404,600 B1 (2002), U.S. Pat. No. 6,421,211 B1 (2002), U.S. Pat. No. 6,512,659 B1 (2003), U.S. Pat. No. 6,807,030 (2004) to Hawwa et al.

In particular, push-pull piezoelectric actuated devices have been developed as a fine actuator for the servo system, while the voice coil motor functions as a coarse actuator. As shown in FIG. 1, in a current disk drive 100, the first stage VCM arm 110 is controlled and turned around the pivot bearing 108. It positions the read/write head 102 to rest on the target tracks 116 for read/write operation. The data information is stored or read from the disk platters 112, which are fixed on the spindle 114 and rotate at high speed. The bit data and control signals are transmitted to and from the electronics block through the flex circuit 118. The second stage actuator will replace the original suspension 104, which is connected to the E-block 106.

In the prior art, the original suspension 104 can be replaced by a push-pull piezoelectric actuated device 20. The device is mounted on a specially fabricated suspension 28 by an adhesive. In the device, one piezoelectric actuator 22A contracts and pulls the suspension 28 in the longitudinal direction while the other piezoelectric actuator 22B expands and pushes the suspension 28 in the longitudinal direction. As the base plate 26 is fixed on the E-block 106, the load beam swings back and forth around the hinge 24. The motion induced from the actuators is amplified by a lever mechanism about the pivot at hinge 24. Then this in-plane movement is imparted to the slider flying on the disk surface. It cooperates with the movement of the VCM to form a dual-stage servo system.

In hard disk drives, runout refers to the deviation of the read/write head from the target track, which is one of the main contributors to track misregistration. There are two kinds of runout: repeatable runout (RRO) and non-repeatable runout (NRRO). The RRO is a periodic signal and is phase locked to the spindle rotation. NRRO has characteristic frequencies, but it is not locked to a particular location on the disk. For high density data recording and high-speed disk rotation, the NRRO factors that affect the precision positioning of the read/write head are the vibrations of disk and spindle assembly, head carriage arm, and suspension subjected to the airflow disturbance. The excitation force comes from the spatiotemporal fluctuation of pressure generated mainly by the disturbance of airflow onto the disk and arm surface. On the other hand, better shock resistance is demanded for the hard disk drives under sudden excitations such as during shipping and read/write operations.

However, the shock resistance of the prior dual-stage piezoelectric actuators may not be good enough because they are using piezoelectric patches only such like the manner in the prior art of FIG. 1.

SUMMARY OF THE INVENTION

To overcome the shortcoming of using piezoelectric patches only, a dual-stage actuator with embedded passive damping mechanism is proposed not only to achieve precise positioning of the read/write head but also to provide sufficient shock resistance.

In accordance with present invention, a new piezoelectric actuated suspension with passive damping is designed for precision positioning of the read/write head while reducing undesirable vibrations from the internal or external sources. This device has two main portions. The first portion is the piezoelectric elements providing active positioning by applying the voltage. The second portion is the viscoelastic damping layers underneath the active piezoelectric elements to reduce the vibrations arising from the airflow disturbances arised from the spindle rotation at high speed or external shock excitations.

The disclosed technology is an active-passive hybrid control system to be used in dual-stage hard disk servo systems. The sole study on active-passive hybrid control systems can be found in the references of U.S. Pat. No. 5,315,203 (1994) to Bicos, U.S. Pat. No. 5,485,053 (1996) to Baz, and U.S. Pat. No. 5,838,092 (1998) to Wang et al. The active-passive hybrid system uses active actuators and passive elements. Thus, the apparatus of the invention not only provides active positioning and vibration control from the piezoelectric actuators but also possesses the damping mechanism from the passive viscoelastic layers.

The invention achieves better shock resistance than that with using piezoelectric patches only since the viscoelastic layers have the advantage to suppress the vibrations of the arm and suspension in a hard disk drive. The soft viscoelastic layers sandwiched between the suspension and the piezoelectric patches act a cushioning function for the disk-head assembly to reduce the transmission of shock and dissipate vibration energies to the read/write head.

Another specific object of the present invention is to use the edge elements in actuator bonding. The advantage of them is to enhance the transmissibility from the piezoelectric actuators to the host structure. The edge elements are high stiff adhesive materials, which physically connect the boundaries of piezoelectric coversheets to the suspension to directly transmit active forces and moments for the actuation of the read/write head.

Yet another specific object of the present invention is to use the soft boundary covers to cover the exposed areas of the sandwiched viscoelastic layer between the piezoelectric coversheet and the suspension. The usage of the soft boundary covers is optional. It is not necessary if a very low outgassing and ionic level of viscoelastic material is used. However, for using traditional viscoelastic materials, the soft boundary covers are required to block any tiny grains peeling from the viscoelastic layer to prevent any contaminants from going into the clean sealed hard disk drive chamber.

In one embodiment of the invention, the actuators are two layers of stacked piezoelectric sheets. By increasing the piezoelectric stacked layers, the stiffness of the actuators is increased and therefore increases actuation forces of the actuators too. Two piezoelectric sheets are stacked in standard polarization configurations with the parallel connection. This alternate configuration can reduce the drive voltage in the read/write operation. The multi stacked layer piezoelectric actuator can be used to replace the single layer piezoelectric actuator but it should not exceed the load that the suspension can withstand and the allowable space in the disk drive chamber.

In another embodiment of the invention, there are two pairs of actuators mounted on the suspension. One pair of actuators are mounted on the upper side of the suspension; two piezoelectric sheets are in parallel and their centers are in a line, which is perpendicular to the longitudinal direction. And the other pair of actuators are mounted on the opposite down side of the suspension in the same manner. Along the longitudinal axis of the suspension, a reversed E-shaped area is etched for disposing specially designed piezoelectric actuators near the base plate. Two piezoelectric actuators sandwich the front strip of E-shaped area and are parallel to the longitudinal axis of the suspension. And the other two actuators sandwich the rear strip of E-shaped area in the same manner. Between them, the middle strip of the E-shaped area is linked to the base plate to act as a hinge for supporting and pivoting.

BRIEF DESCRIPTION OF THE FIGURES

The foregoing features and other advantages of the invention will be better understood from the accompanying drawings together with a description thereof given below, which serve to illustrate example embodiments of the invention. In the drawings.

DETAILED DESCRIPTION OF THE INVENTION

Figure 1:
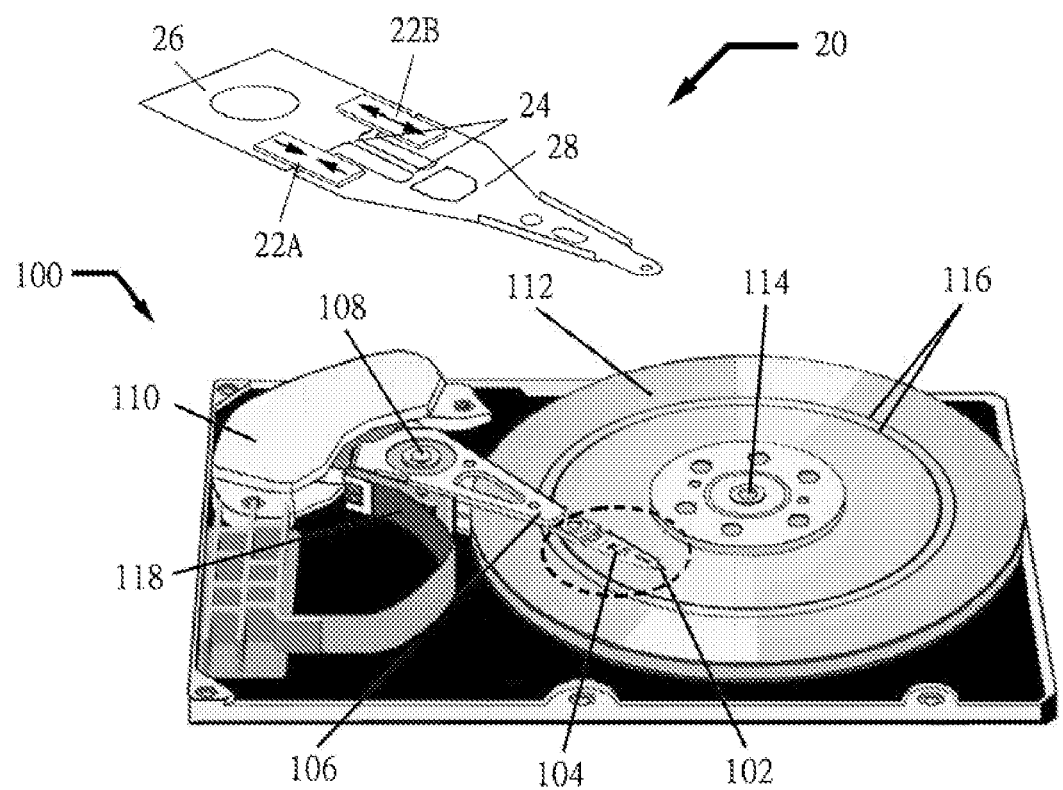
FIG. 1 is a perspective view of a hard disk drive associated with a piezoelectric actuated suspension without viscoelastic damping layer.
Figure 2:
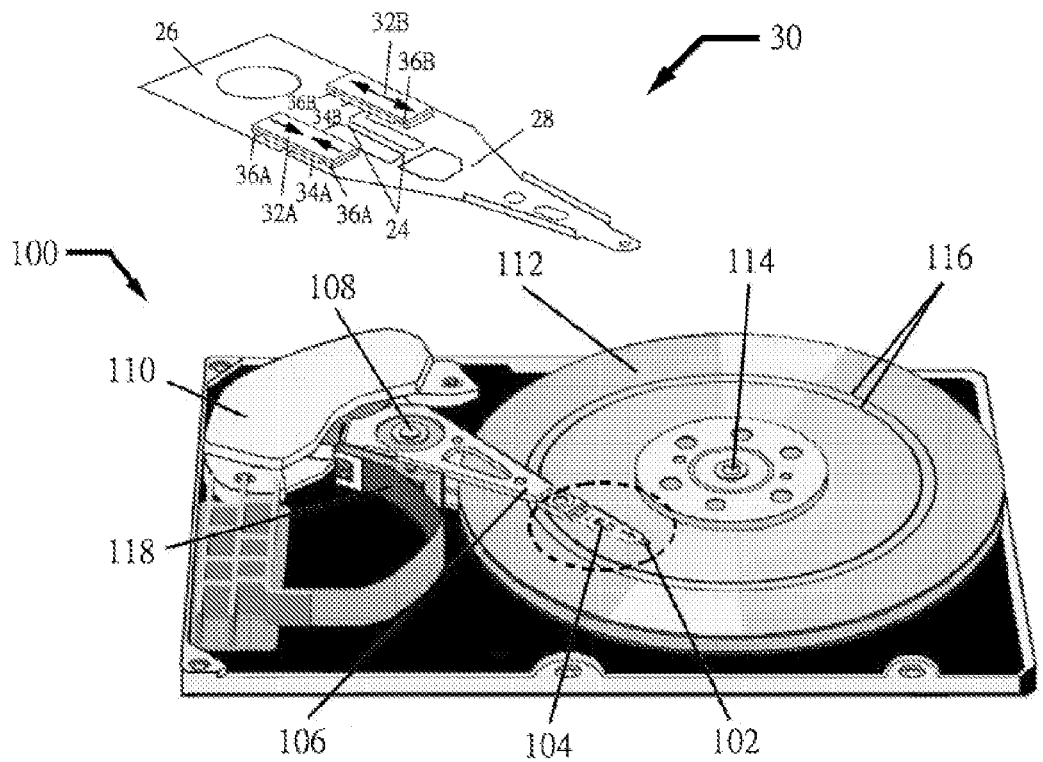
FIG. 2 is a perspective view of a hard disk drive associated with a piezoelectric actuated suspension with viscoelastic damping layers and edge elements.
Figure 3:
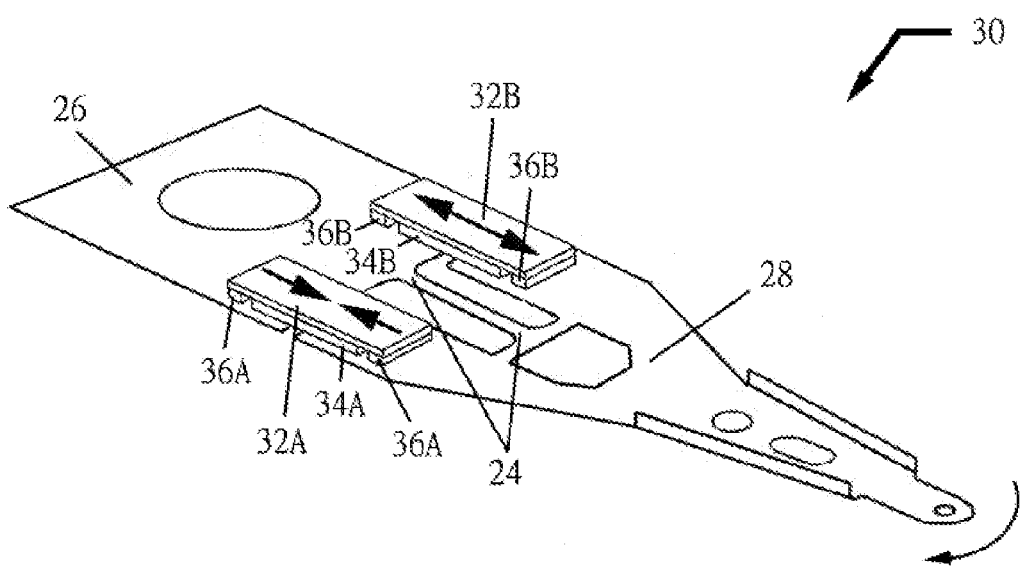
FIG. 3 is a perspective view of a piezoelectric actuated suspension with viscoelastic damping layers and edge elements.

Due to the shortcoming of using piezoelectric patches only in FIG. 1, piezoelectric actuators with embedded damping mechanism used in dual-stage servo systems for hard disk drives is proposed in FIG. 2 to provide precise in-plane motion of the read/write head and sufficient shock resistance through active-passive hybrid control actions. FIG. 3 illustrates the piezoelectric actuated suspension with passive damping used in FIG. 2.

Along the longitudinal axis of a suspension, a reversed E-shaped area is etched for disposing specially designed piezoelectric actuators near the base plate. Those two piezoelectric actuators are in parallel and their centers are in a line, which is perpendicular to the longitudinal direction. One of them is lengthwise mounted on the front strip of the E-shaped area and parallel to the longitudinal axis of the suspension. And the other one is mounted on the rear strip of the E-shaped area in the same manner. Meanwhile, the middle strip of the E-shaped area is linked to the base plate to act as a hinge for supporting and pivoting.

In the device 30, the suspension has two piezoelectric sheets 32A and 32B on the front A and the rear B in the perspective view of a piezoelectric actuated suspension in FIG. 3, respectively. In the clockwise motion, the plate 32A contracts and pulls the suspension 28 in the longitudinal direction while the opposing actuator 32B expands and pushes the suspension 28 in the longitudinal direction, and vise versa in the counterclockwise direction. The in-plane motion is transferred from the actuators to suspension, and then to the read/write head for head positioning. Between the piezoelectric sheets and the suspension, viscoelastic damping layers are inserted for providing passive damping, designated as 34A and 34B. Since the low stiffness of the viscoelastic materials reduce the transmissibility between the active piezoelectric layer and the suspension, at the boundaries of piezoelectric sheets, edge elements 36A and 36B with high stiffness are used to connect the suspension 28 and the piezoelectric sheets 32A and 32B. This configuration enhances the transmission of forces and moments between the active piezoelectric layer and the suspension. And therefore, as the base plate 26 is fixed on the E-block 106, the load beam can swing back and forth around the hinge 24. The in-plane motion induced from the actuators is amplified by a lever mechanism and imparted to the read/write head in positioning.

The speed of the spindle motor in a high-performance modern hard disk drive is increasing ever to meet the demand. However, the high speed rotation causes airflows in the drive. It has a considerable effect on the accuracy of head positioning. The vibrations induced from the internal disturbances such as airflow and external shocks can be suppressed through the active-passive hybrid control design in the embodiment as shown in FIG. 3. The viscoelastic layers attached to the suspension suppress the structural resonant modes of suspension excited by the airflows and reduce the transmission of the vibrations from the carriage arm to the suspension excited by the external shocks. Besides, the active control, which comes from the controlled piezoelectric elements and VCM, and the passive damping from the viscoelastic layers can both contribute to precision positioning and vibration suppression during track seeking and following.

Figure 4:
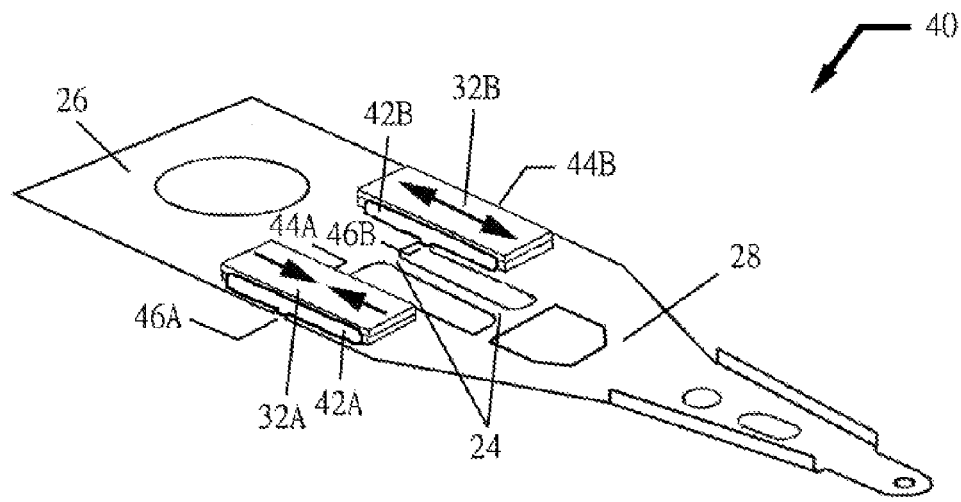
FIG. 4 is a perspective view of a piezoelectric actuated suspension with viscoelastic damping layers and the complementary parts including edge elements and soft boundary covers.
Figure 5:
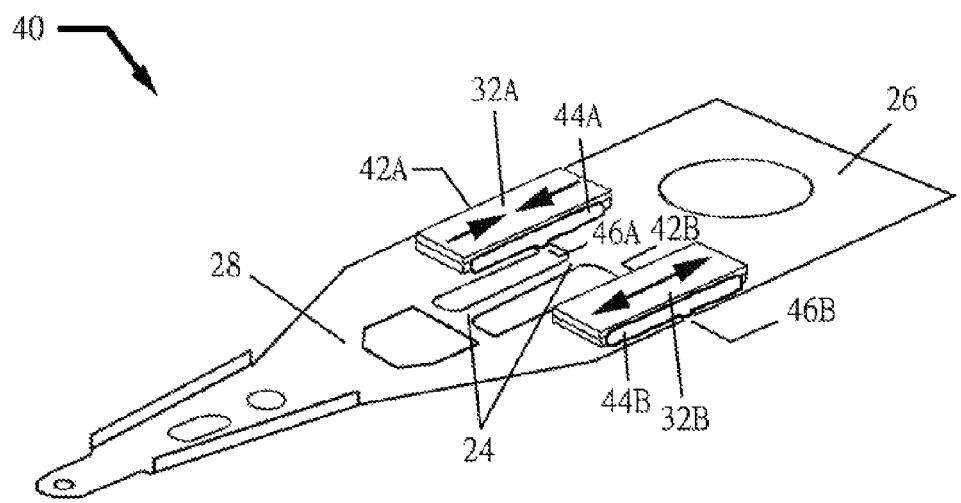
FIG. 5 is a horizontally flipped perspective view of a piezoelectric actuated suspension with viscoelastic damping layers and the complementary parts including edge elements and soft boundary covers.

Inner chamber of the hard disk drive should be clean and isolated from the outside air. Any contaminants left on the disk platter would cause a read/write head crash since the gap between the flying slider and the disk platter is in the nano scale. For the traditional viscoelastic material, it has a tendency to degrade, embrittle, and disintegrate with time. The life of a hard disk drive can be up to tens of years. After years, some tiny grains peeling from the degraded traditional viscoelastic layer would contaminate the inside clean chamber to cause the disk drive fail in operation. In order to avoid the defect, on the front A of the embodiment 40 shown in FIG. 4 and FIG. 5, boundary covers 42A and 44A are used to cover the areas of the viscoelastic layers exposed in the lengthwise direction while 46A covers the exposed area of the viscoelastic layer at the bottom gap of the suspension in the widthwise direction. The remaining boundary covers 42B, 44B, and 46B cover the areas of the viscoelastic layers exposed on the rear B in the same manner. The boundary covers are soft and very low outgassing and ionic. And the thickness of boundary covers is thin and therefore they do not impose a constraint upon the deflection of the piezoelectric layer. Using low outgassing and ionic level of viscoelastic material, for example ultra-pure viscoelastic damping polymer 242 by 3M Corporation, could save the cost for bonding the boundary covers.

Figure 6:
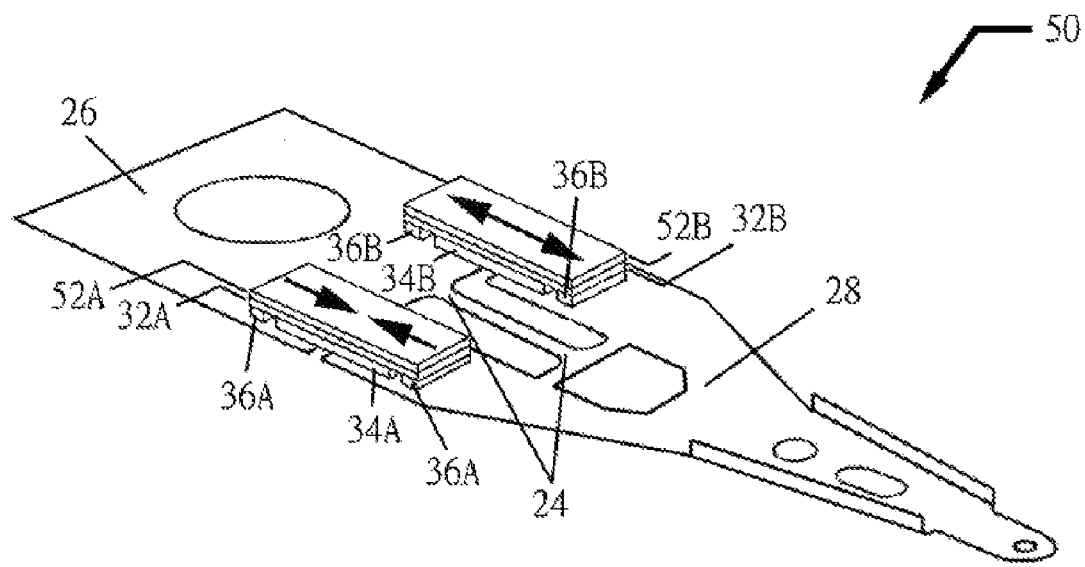
FIG. 6 is a perspective view of a piezoelectric actuated suspension with the viscoelastic damping layers and edge elements using two layers of stacked actuators.
Figure 7:
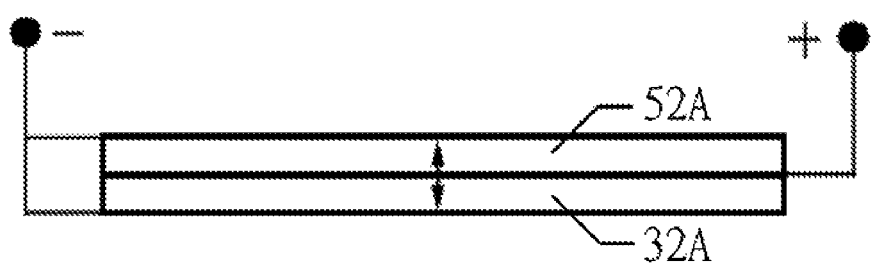
FIG. 7 is a cross-sectional view of a two-layer stacked piezoelectric actuator and its driving voltage scheme (two layers are polarized in opposite directions).
Figure 7:
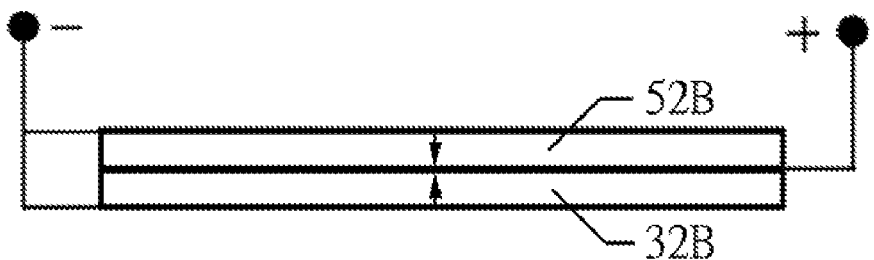

The configuration of piezoelectric elements in the invention is not limited to one single layer only. They can be multiple layers of stacked piezoelectric actuators to increase not only the stiffness but also the actuation forces with the same voltage applied to one single layer case. FIG. 6 illustrates two layers of stacked piezoelectric actuators in the device 50. The additional piezoelectric sheet 52A is stacked on the original piezoelectric sheet 32A on the front A while their polarization and voltage supply configuration is shown in FIG. 7. It is a standard polarization configuration with the parallel connection. Similarly, on the rear B, the additional piezoelectric sheet 52B is stacked on the original piezoelectric sheet 32B while their polarization and voltage supply configuration is also shown in FIG. 7. Arrows shown in the drawing represent polarization directions. However, the increment of stacked layers cannot exceed the allowable load and space on the suspension within the disk drive chamber.

Figure 8:
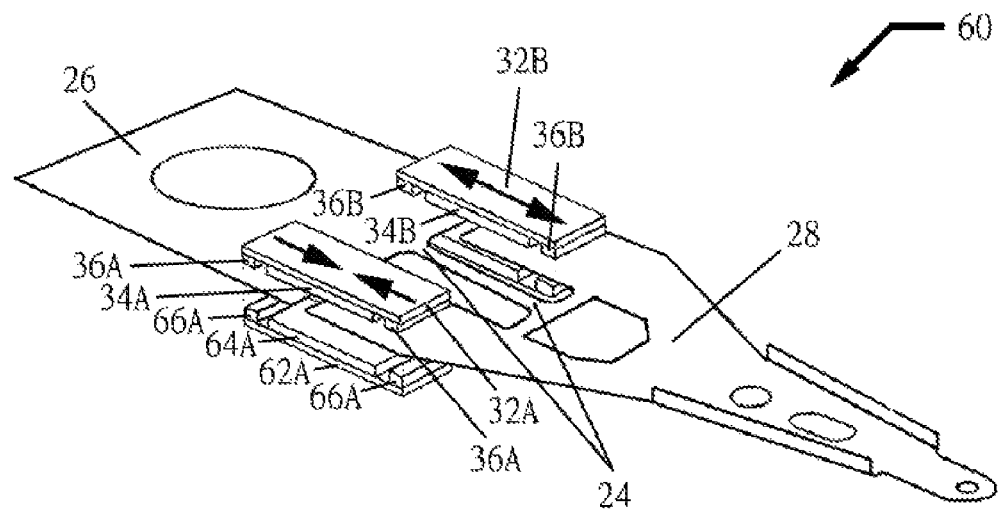
FIG. 8 is a perspective view of a piezoelectric actuated suspension with two pairs of actuators with viscoelastic damping.
Figure 9:
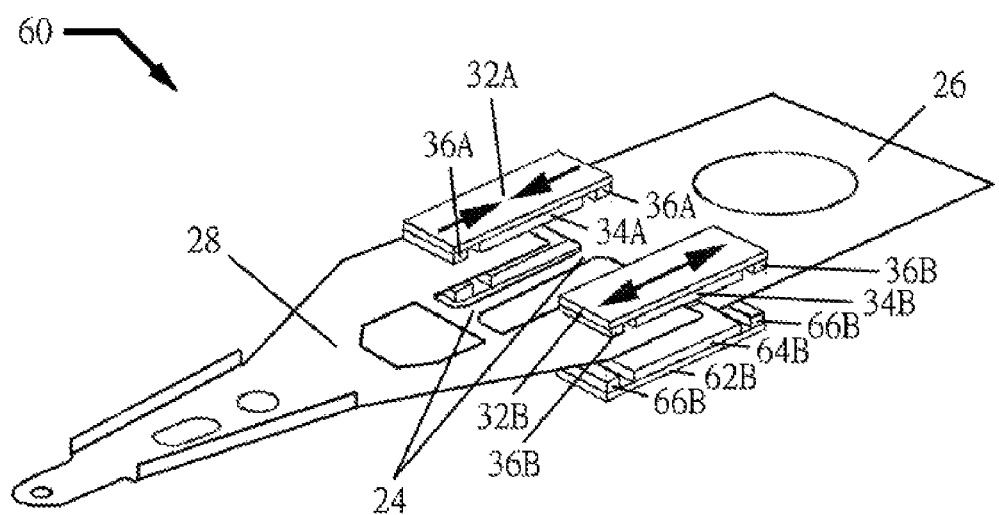
FIG. 9 is a horizontally flipped perspective view of a piezoelectric actuated suspension with two pairs of actuators with viscoelastic damping.

FIGS. 8 and 9 show the piezoelectric actuated suspension equipped with two pairs of actuators. One pair of piezoelectric sheets, 32A and 32B, are mounted on the upper side of the suspension; they are in parallel and their centers are in a line, which is perpendicular to the longitudinal direction. And the other pair, 62A and 62B, are mounted on the opposite down side of the suspension in the same manner. Underneath the piezoelectric sheets, there are four 34A, 34B, 64A, and 64B viscoelastic layers, so as to enhance the passive damping mechanism with more energy dissipated. And the boundaries of piezoelectric sheets are connected to the suspension through the edge elements 36A, 36B, 66A, and 66B, respectively. Along the longitudinal axis of the suspension, the piezoelectric actuators are disposed on a reversed E-shaped area etched near the base plate. The piezoelectric actuators 32B and 62B sandwich the rear strip of E-shaped area and are parallel to the longitudinal axis of the suspension in FIG. 8. And the piezoelectric actuators 32A and 62A sandwich the front strip of E-shaped area in the same manner as shown in FIG. 8. Between them, the middle strip of E-shaped area is linked to the base plate to act as a hinge 24 for supporting and pivoting. The suspension sandwiched by two pairs of piezoelectric actuators in the embodiment adopts a force balance arrangement and also strengthens the actuation force. It reduces out-of-plane motion due to the deformation of the suspension imparted on the read/write head during fine actuation, thus reducing the chance of damage due to possible contact between slider and the disk surface. For the embodiment using one pair of actuators only, out-of-plane motion can be reduced with the proper design of the hinge.

The foregoing descriptions of specific embodiments of the present invention are the purposes for a thorough understanding of the invention. Although the details of the invention have been described in view of the above illustration, various modifications and variations may be made without departing from the spirit and scope of the invention. It is intended that the scope of the invention is defined by the following claims and their equivalents.

The invention claimed is:

1. A piezoelectric actuated suspension with passive damping, comprising:
 a base plate,
 a suspension, connected to the base plate by a hinge,
 a first viscoelastic damping layer, and a first piezoelectric element, on the first viscoelastic damping layer,
 a second viscoelastic damping layer, and a second piezoelectric element, on the second viscoelastic damping layer,
 a first edge element, connecting a first end of the first piezoelectric element to a top face of the suspension,
 a second edge element, connecting a second end of the first piezoelectric element to a top face of the base plate,
 a third edge element, connecting a first end of the second piezoelectric element to the top face of the suspension, and
 a fourth edge element, connecting a second end of the second piezoelectric element to the top face of the base plate;

wherein the hinge is positioned between the first and second piezoelectric elements such that actuation of the piezoelectric elements causes the suspension to pivot about the hinge, the first viscoelastic damping layer is between the first piezoelectric element and the top face of the suspension, and the second viscoelastic damping layer is between the second piezoelectric element and the top face of the suspension.

2. The piezoelectric actuated suspension of claim 1, wherein the edge elements enhance the transmission of forces and moments between the piezoelectric elements and the suspension.

3. The piezoelectric actuated suspension of claim 1, wherein the viscoelastic damping layers reduce the transmission of vibrations from the base plate to the suspension.

4. The piezoelectric actuated suspension of claim 1, further comprising:
   a third piezoelectric element, stacked on top of the first piezoelectric element, and
   fourth piezoelectric element, stacked on top of the second piezoelectric element.

5. The piezoelectric actuated suspension of claim 4, wherein:
   the first and third piezoelectric elements are electrically connected in parallel and have opposite polarizations, and
   the second and fourth piezoelectric elements are electrically connected in parallel and have opposite polarizations.

6. The piezoelectric actuated suspension of claim 1, further comprising:
   a third viscoelastic damping layer, and a third piezoelectric element, on the third viscoelastic damping layer,
   a fourth viscoelastic damping layer, and a fourth piezoelectric element, on the fourth viscoelastic damping layer,
   a fifth edge element, connecting a first end of the third piezoelectric element to a bottom face of the suspension,
   a sixth edge element, connecting a second end of the third piezoelectric element to a bottom face of the base plate,
   a seventh edge element, connecting a first end of the fourth piezoelectric element to the bottom face of the suspension, and
   an eighth edge element, connecting a second end of the fourth piezoelectric element to the bottom face of the base plate;
   wherein the third viscoelastic damping layer is between the third piezoelectric element and the bottom face of the suspension, and
   the fourth viscoelastic damping layer is between the fourth piezoelectric element and the bottom face of the suspension.

7. The piezoelectric actuated suspension of claim 1, further comprising:
   soft boundary covers, covering exposed areas of the viscoelastic damping layers.

8. The piezoelectric actuated suspension of claim 6, further comprising:
   soft boundary covers, covering exposed areas of the viscoelastic damping layers.

9. The piezoelectric actuated suspension of claim 7, wherein the soft boundary covers comprise a low-outgassing, ionic material.

10. The piezoelectric actuated suspension of claim 1, wherein the edge elements comprise a rigid material.

11. The piezoelectric actuated suspension of claim 6, wherein the edge elements comprise a rigid material.

* * * * *

UNITED STATES PATENT AND TRADEMARK OFFICE
CERTIFICATE OF CORRECTION

PATENT NO. : 7,983,008 B2  
APPLICATION NO. : 11/551734  
DATED : July 19, 2011  
INVENTOR(S) : Liao et al.

Page 1 of 1

It is certified that error appears in the above-identified patent and that said Letters Patent is hereby corrected as shown below:

Column 7, line 22, in Claim 4, delete "fourth" and insert -- a fourth --.

Signed and Sealed this
Twenty-second Day of November, 2011

David J. Kappos  
*Director of the United States Patent and Trademark Office*